United States Patent [19]

Suzuki et al.

[11] Patent Number: 5,097,502
[45] Date of Patent: Mar. 17, 1992

[54] TELEPHONE WITH SPEED DIAL AND RECORDING OF REMOTELY TRANSMITTED NUMBERS

[75] Inventors: Katsuo Suzuki; Kazuyuki Umebayashi, both of Tokyo, Japan

[73] Assignee: Aisin Seiki K.K., Aichi, Japan

[21] Appl. No.: 536,035

[22] Filed: Jun. 12, 1990

Related U.S. Application Data

[63] Continuation of Ser. No. 322,431, Mar. 13, 1989, abandoned.

[30] Foreign Application Priority Data

Mar. 12, 1988 [JP] Japan .................................. 63-058880

[51] Int. Cl.$^5$ .................................................. H04M 1/00
[52] U.S. Cl. .................................... 379/356; 379/354; 379/355
[58] Field of Search ................ 379/143, 359, 355, 357, 379/356, 70, 81, 88, 206

[56] References Cited

U.S. PATENT DOCUMENTS

| 4,172,969 | 10/1979 | Levine et al. | 379/70 |
| 4,304,968 | 12/1981 | Klausner | 379/142 X |
| 4,324,954 | 4/1982 | Taylor | 379/355 |

FOREIGN PATENT DOCUMENTS 1157093 7/1969 United Kingdom .................. 379/81

Primary Examiner—James L. Dwyer
Assistant Examiner—Jhancy Augustus
Attorney, Agent, or Firm—Sughrue, Mion, Zinn Macpeak & Seas

[57] ABSTRACT

A mobile telephone apparatus having a conventional key pad, memory for storing telephone numbers at locations identifiable by certain digits and a processor for controlling the auto dialing of telephone numbers in response to a key pad input of the respective digits. The apparatus further includes a capability of receiving telephone numbers transmitted from a remote operator and storing the numbers at memory location that may be auto dialed.

6 Claims, 8 Drawing Sheets

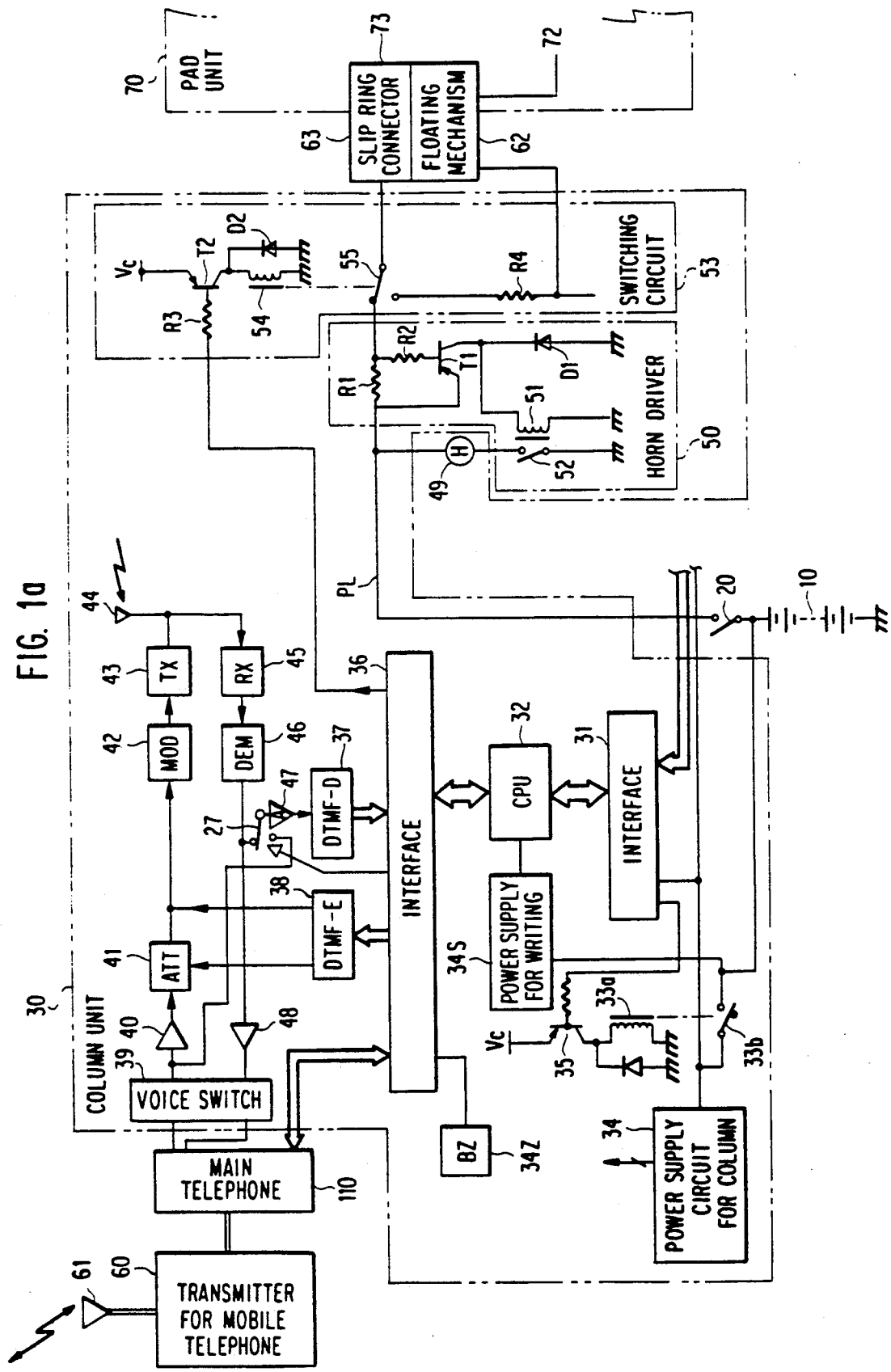

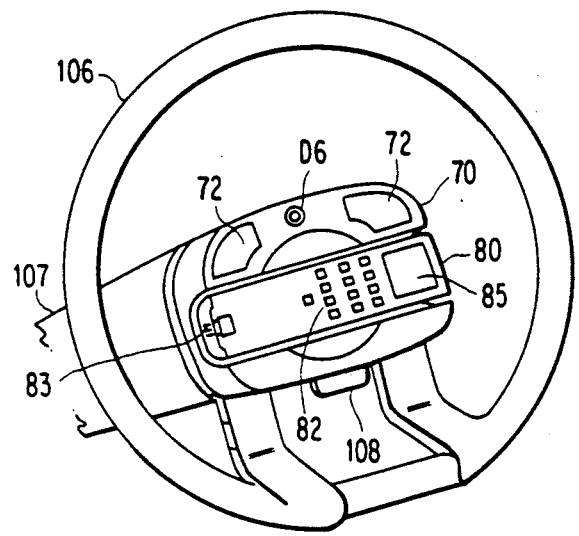
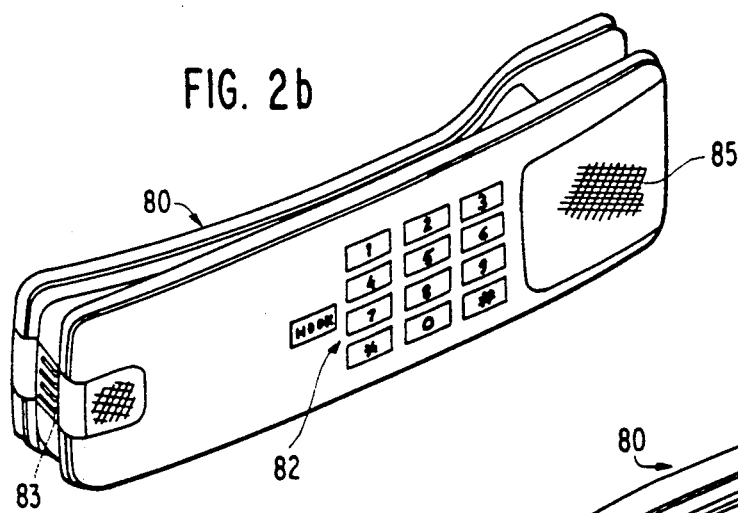
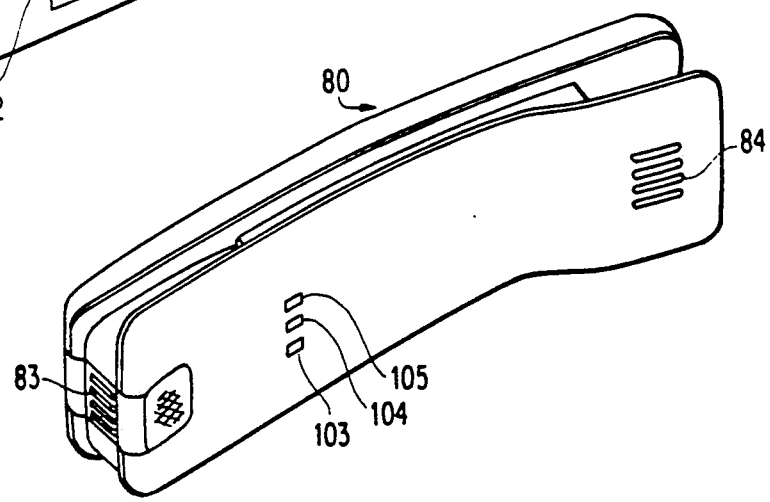

TELEPHONE WITH SPEED DIAL AND RECORDING OF REMOTELY TRANSMITTED NUMBERS

This is a continuation of application Ser. No. 07/322,431 filed Mar. 13, 1989, now abandoned.

BACKGROUND OF THE INVENTION

The present invention relates to a telephone which has an auto dialing operation, especially a telephone which has a memory for storing several telephone numbers and reads out and calls a stored telephone number automatically.

A conventional telephone which has an auto dialing operation is disclosed in Japanese Patent Laid-Open Application No. 61(1986)-82560. This telephone has a memory for storing several telephone numbers and such telephone numbers are stored in correspondence with a respective one-or two-digit number that relates to each telephone number. Once a telephone number and its corresponding digit number is stored, a caller can dial the whole telephone number by simply dialing the digit number. Usually, such digit number calling or "speed dialing" requires the caller to press a special key followed by the desired digit number. Such speed dialing shortens the dialing time and reduces the opportunity to dial to a wrong number.

When one person is talking by telephone with another person, often one will ask the other's telephone number or another person's telephone number. Typically, the number would be written down on paper for later use since, after the call is completed, someone else may call or a call will be placed immediately to another person. However, it may be very difficult to write a new telephone number down on paper if one is using a mobile telephone while driving a car. Moreover, there may be many ways to miss the telephone number, such as mishearing and miswriting. Then, in calling the new number, it will take some time to dial a new telephone number and errors can occur by misdialing.

SUMMARY OF THE INVENTION

Accordingly, one of the objects of the present invention is to provide a telephone which obviates the above drawbacks.

To achieve the above objects and in accordance with the principles of the invention as embodied and broadly described herein, we have developed a telephone apparatus which comprises: keys, a memory for storing telephone numbers, a receiving switch apparatus for designating the reception of a telephone number, a writing apparatus for writing a received telephone number into the memory in accordance with the operation of the receiving switch apparatus, a calling switch apparatus for designating the reading out of a telephone number stored in said memory and an auto dialing apparatus for dialing the read out telephone number in accordance with the operation of the calling switch means.

In order to illustrate operation of the invention, assume that party A makes a phone call to party B (the first call). Also assume that for some reason, party B has to make another phone call to party A's associate (party C) or even back to party A (the second call) after the first call is terminated. However, during the first call, party B may need to ask party A for a telephone number and wish to record the number. In accordance with the above described telephone apparatus, party B can have party A enter into party B's telephone party A's telephone number, or party C's telephone number, using A's telephone. Party A will enter the numbers by pressing the appropriate key pads. As party A keys the numbers into A's telephone, the telephone numbers are transmitted into party B's telephone through the telephone line. If party B wishes to record the numbers transmitted by party A, party B will activate the receiving switch apparatus. With the switch activated, party B's telephone receives and writes the transmitted numbers into the memory.

Now party B's telephone has memorized the transmitted telephone number (received telephone number) for party A or party C. Later, after the first call has been terminated and party B needs to call Party A or C (the second call), party B simply operates the calling switch to identify an access to the transmitted and stored telephone number. The auto dialing apparatus reads out the stored telephone number for party A or C and places the second call.

To summarize, using the invention, party B can receive a telephone number during a first call and can make a second phone call to party A or party C automatically, without manually dialing party A's or party C's telephone number at all.

BRIEF DESCRIPTION OF THE DRAWINGS

For a full understanding of the true scope of the invention, the following detailed description should be read in conjunction with the drawings, wherein FIGS. 1a and 1b are circuit diagrams showing one embodiment of this invention;

FIG. 2a is a perspective view of one embodiment of a pad and a handset of this invention;

FIGS. 2b and 2c are perspective views of one embodiment of a handset of this invention.

DETAILED DESCRIPTION OF THE PREFERRED EMBODIMENTS

Figure 1B:
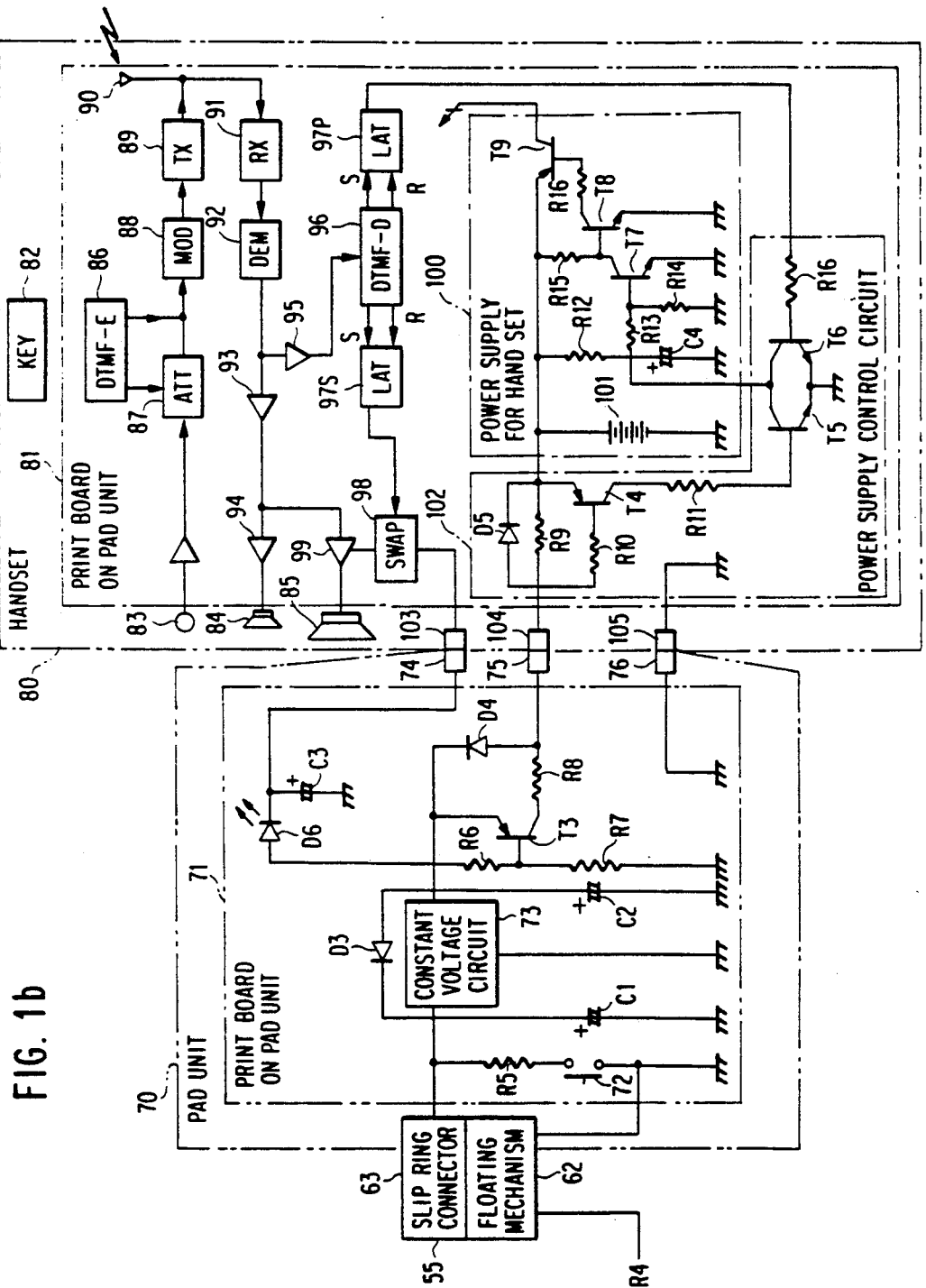

FIGS. 1a and 1b are circuit diagrams of one embodiment of this invention. This embodiment shows a mobile telephone set in an automobile. The circuit elements shown in FIG. 1a are within a unit mounted in the passenger compartment of an automobile far from a steering wheel. FIG. 1b shows the circuit elements which are mounted in a pad 70 held by a floating mechanism 62 that is positioned on the steering shaft. Also shown are current elements that are mounted in a handset 80 held by the pad 70.

Referring to FIG. 1a, a main telephone 110 is connected to a transmitter 60 mounted in an automobile and connected to a column unit 30 which is a part of an extension telephone. The main telephone 110 has a relay which connects the transmitter 60 with the main telephone. The relay changes a connection of the transmitter 60 from one with the main telephone to one with the column unit 30. The column unit 30 is connected with a battery 10 and engine key switch 20. The pad unit 70 is connected with the column unit 30 through a slip ring connector 63. The column unit 30 is mounted on a stationary steering column cover 107 (FIG. 2a). The pad unit 70 is mounted on the steering shaft (not shown) by the floating mechanism 62, which remains stationary in spite of the steering shaft rotation. Examples of the floating mechanisms 62 and the slip ring connector 63 are shown in Japanese Patent Laid Open Application Nos. 61(1986)-81841, 61(1986)-81251 and 61(1986)-82541.

A power supply line PL is connected to the battery 10 through the engine key switch 20. A positive voltage input terminal of the PC board 71 (FIG. 1b) of the pad unit 70 is connected to the power supply line PL through a resistor R1, which detects that a horn switch 72 (FIG. 1b) is "on", a segment 55 of a relay of a switching circuit 53 and the slip ring connector 63. When the key switch 20 is closed, a voltage is applied to the input terminal of the print board 71 from the battery 10. A ground terminal of the PC board 71 is connected to a ground line of the column unit 30 via a mechanical element of the floating mechanism 62.

Wireless transmit circuits (38–44) and receiver circuits (44–48, 37 and 39) are connected to the main telephone 110. These transmit circuits and receiver circuits have an encoder 38 and a decoder 37 in order to send control codes to the handset 80 and to receive control codes from the handset 80. An attenuator circuit 41, having an attenuator and a switch, will attenuate a signal from the transmitter 60 to cut down the signal when code signals are sent to the handset 80 and will not attenuate a signal from the transmitter 60 when the handset 80 is connected to the transmitter 60. A switch 27, which is connected between an amplifier 47 and a demodulator 46, applies an output signal of the demodulator 46 to the amplifier 47. A microprocessor (CPU) 32 sends change signals to the switch 27. In one position, the switch 27 applies an output signal of a voice switch 39 (a received signal when calling) to the amplifier 47. In the other position, the switch 27 connects the output of demodulator 46 to amplifier 47 when the CPU is to memorize a telephone number in the internal RAM.

The CPU 32 is connected to a control line of the main telephone, a data input line of the encoder 38 and an output line of the decoder 37. A column power supply circuit 34 is connected to the power line PL and supplies power to the circuits. A segment 33b of a normally open relay 33a is connected between an input power line of column power supply circuit 34 and the battery 10. The segment 33b of the relay 33a closes the line when a transistor 35 is "on". The transistor 35 is controlled by the CPU 32 through an interface circuit 31. A waiting power supply circuit 34s is connected to the battery 10 directly and supplies minimum power to the CPU all the time. Thus power is supplied to the CPU 32 even if the key switch 20 is "off". Because the CPU 32 has an internal RAM for memorizing several telephone numbers, the waiting power supply circuit 34s supplies power to the CPU 32 so that the CPU 32 can keep the memorized data if the switch 20 is turned "off". A relay 54 of the switching circuit 53 changes over a relay segment 55 from a terminal of the horn driver 50 to a terminal of a resistor R4 when a transistor T2 is turned "on". The CPU 32 controls the transistor T2 through the interface circuit 36.

As shown in FIGS. 1a, when the relay segment 55 is connected to the driver 50 and the key switch 20 is closed, if the horn switch 72 (FIG. 1b) of the pad unit 70 is closed, a closed loop is made by the lines through the battery 10, key switch 20, resistor R1, segment 55, slip ring connector 63, resistor R5 and the horn switch 72. The transistor T1 of the horn driver 50 is turned "on" and the relay segment 52 of the relay 51 is closed. Thus the power is applied to the horn 49 from the battery 10 so that the horn 49 blows. When the horn switch 72 is opened, the transistor T1 is turned "off", the segment 52 is opened and the horn stops blowing. The power line from the battery 10 to the pad 70 works to power the horn as well.

Referring to FIG. 1b, a PC board 71 of the pad unit 70 has a constant voltage circuit IC 73, an overchange limiter for a second battery 101 which is comprised of resistors R6, R7 and R8 and a transistor T3, diodes D3 and D4 which allow power to go to the power supply line PL from the power supply circuit 100 and a display diode D6 for showing that the amplifier power supply is turned "on". A power supply output terminal 75, a ground terminal 76 and an amplifier power supply output terminal 74 are connected to the PC board 71. These terminals 74–76 are mounted on the pad 70 and operatively connect with the handset terminals 103–105.

Referring to FIGS. 1a, 1b, 2a, 2b and 2c, FIG. 2a shows a steering wheel 106 in an automobile. The column unit 30 is mounted under a steering column cover 107. The pad unit 70 is mounted to the floating mechanism 62 and the horn switch 72, and display diode D6 is mounted on the pad 70. The pad 70 has a hollow in which the handset 80 is held. The handset 80 may be removed by pressing a lever 108, and set into the hollow by the operation of a handset setting mechanism (not shown). At the interface of the handset 80 (FIG. 2c) are terminals 103–105, which connect to the terminals 74–76, a speaker 84 and slits for a microphone 83. On the outer face of the handset 80 (FIG. 2b) are a hook switch key, dial keys 82 (which include special keys marked "*" and "#"), a speaker 85 and slits for the microphone 83. As shown in FIG. 2a, when the handset 80 is set on the pad 70, the terminals 74–76 of the pad 70 connect with the terminals 103–105 of the handset 80.

Referring back to FIG. 1b, the wireless transmit circuits (87–90) are connected to the microphone 83 and the wireless receiver circuits (90–94, 99) are connected to the speakers 84 and 85. These transmit and receiver circuits have an encoder 86 to send a code signal to the column unit 30 (FIG. 1a) and a decoder 96 to receive a code signal from the column unit 30. An attenuator circuit 87, having an attenuator and a switch, attenuates a signal from the microphone 83 to cut down the signal when code signals are being sent to the column unit 70 and does not attenuate a signal from the microphone 83 when the handset 80 is connected to the transmitter 60. Power for an amplifier 99 for speaker 85 is supplied by the constant voltage circuit IC 73 through the switch 98, terminal 103, terminal 74 and diode D6. When a code which means "OFF HOOK" is applied to the decoder 96, the decoder 96 sets a latch 97s to a high level output "H". The output "H" turns the switch 98 "on" and power is supplied to the amplifier 99. When a code which means "ON HOOK" is applied to the decoder 96, the decoder 96 resets the latch 97s to a low level output "L". The output "L" turns the switch 98 "off" and the power to the amplifier 99 is cut down.

The power terminal 104 of the handset 80 which connects with the power terminal 75 of the pad unit 70 is also connected to the handset power supply circuit 100 through the resistor R9 of the power supply circuit 102. The handset power supply circuit 100 is comprised of second battery (Ni-Cd battery) 101, a power transistor T9 and switching transistors T7 and T8. When a low level voltage "L" applied to the base of the transistor T7 turns the transistor T7 "off", and the transistors T8 and T9 "on", a collector voltage of the transistor T9 is supplied to the elements of the handsets 80. Thus, the power supply for the extension telephone is turned "on". When a high level voltage "H" applied to the base of the transistor T7 turns the transistor T7 on and the transistors T8 and T9 "off", a collector voltage of the transistor T9 is not supplied to the elements of the handsets 80. Thus, the power supply for the extension telephone is turned "off". If the relay segment 55 (FIG. 1a) is changed over to a terminal of the resistor R4, power from the second battery 101 goes through the resistor R9, the terminal 104, terminal 75, diode D4, diode D3, slip ring connector 63, segment 55 and the resistor R4 and causes a voltage drop at the resistor R9. Because this voltage drop turns the transistor T4 "on" and the transistor T5 "on", the base voltage of the transistor T7 changes to a low level "L". This low level "L" signal turns the transistor T9 "on", thus turning on the extension telephone power supply. In short, the handset power supply circuit 100 is turned "on" in response to the second power on signal (a low level signal "L" of the base voltage of the transistor T7).

The decoder 96 sets a latch 97P to a high level output "H" when it receives the first code (first signal) meaning "extension telephone power supply on". The transistor T6 of the power supply circuit 102 turns "on" in response to the output signal "H" and a base voltage of the transistor T7 changes to a low level output "L". The signal "L" turns the transistor T9 "on" (the extension telephone power supply "on"). Thus the handset power supply circuit 100 is turned "on" (the extension telephone power supply "on") in response to the first power on signal (a low level signal "L" of the base voltage of the transistor T7). The decoder 96 sets a latch 97P to a low level output "L" when it receives the second code (second signal) meaning "extension telephone power supply off". The transistor T6 of the power supply circuit 102 turns "off" in response to the output signal "L" and a base voltage of the transistor T7 changes into a high level output "H". The signal "H" turns the transistor T9 "on" (the extension telephone power supply off). Thus the handset power supply circuit 100 is turned "off" (the extension telephone power supply "off") in response to the absence of the first power "on" signal.

As described above, the extension telephone power supply (transistor T9) is turned "on" by changing over the segment 55 to the resistor T4. By returning the segment 55 to the horn driver 50, the battery 10 supplies power to the power supply circuit 100. However, the extension telephone power supply turns "off". Therefore, the latch 97P should be set to high output "H" by sending the first code to the handset 80. Then, even if the relay segment 55 is back to the horn driver 50, the extension telephone power supply stays "on". This process is executed by the CPU 32 when the key switch 20 is changed from open to closed. The CPU 32 sends the second code in order to reset the latch 97 to low level output "L" when the key switch is changed from closed to open. The relay 33a keeps the power supply circuit 34 "on" by closing the segment 33b so that the CPU 32 can turn the extension telephone power supply "off" and keep the power supply connected to the interface circuits 31 and 36 after the key switch is opened.

Figure 3A:
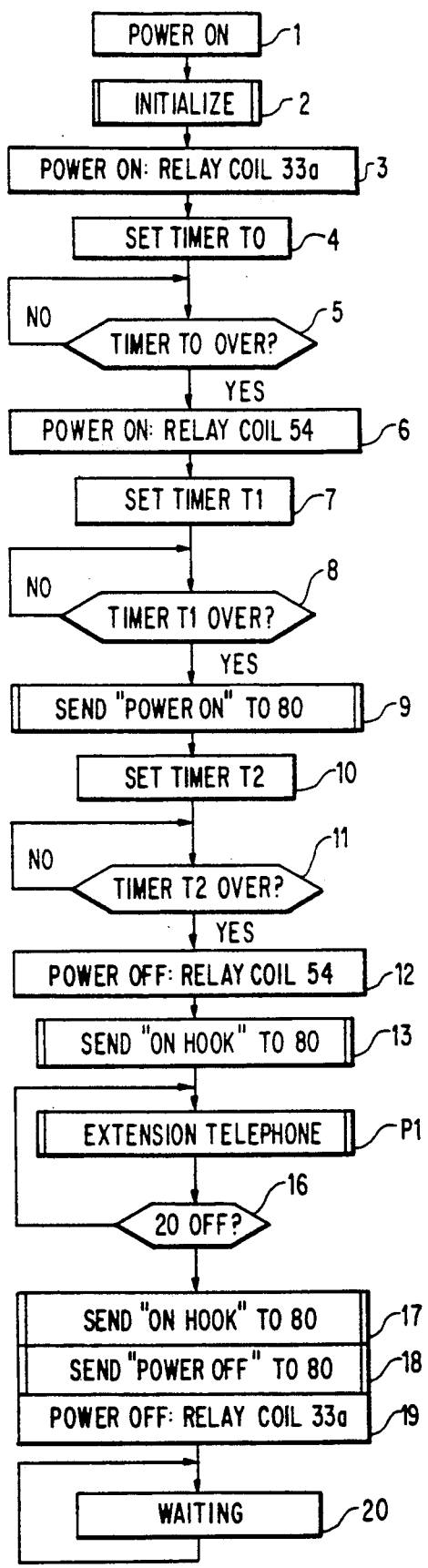
FIGS. 3a, 3b, 3c, 3d and 3e are flowcharts showing an operation of the microprocessor 32 shown in FIG. 1.
Figure 3B:
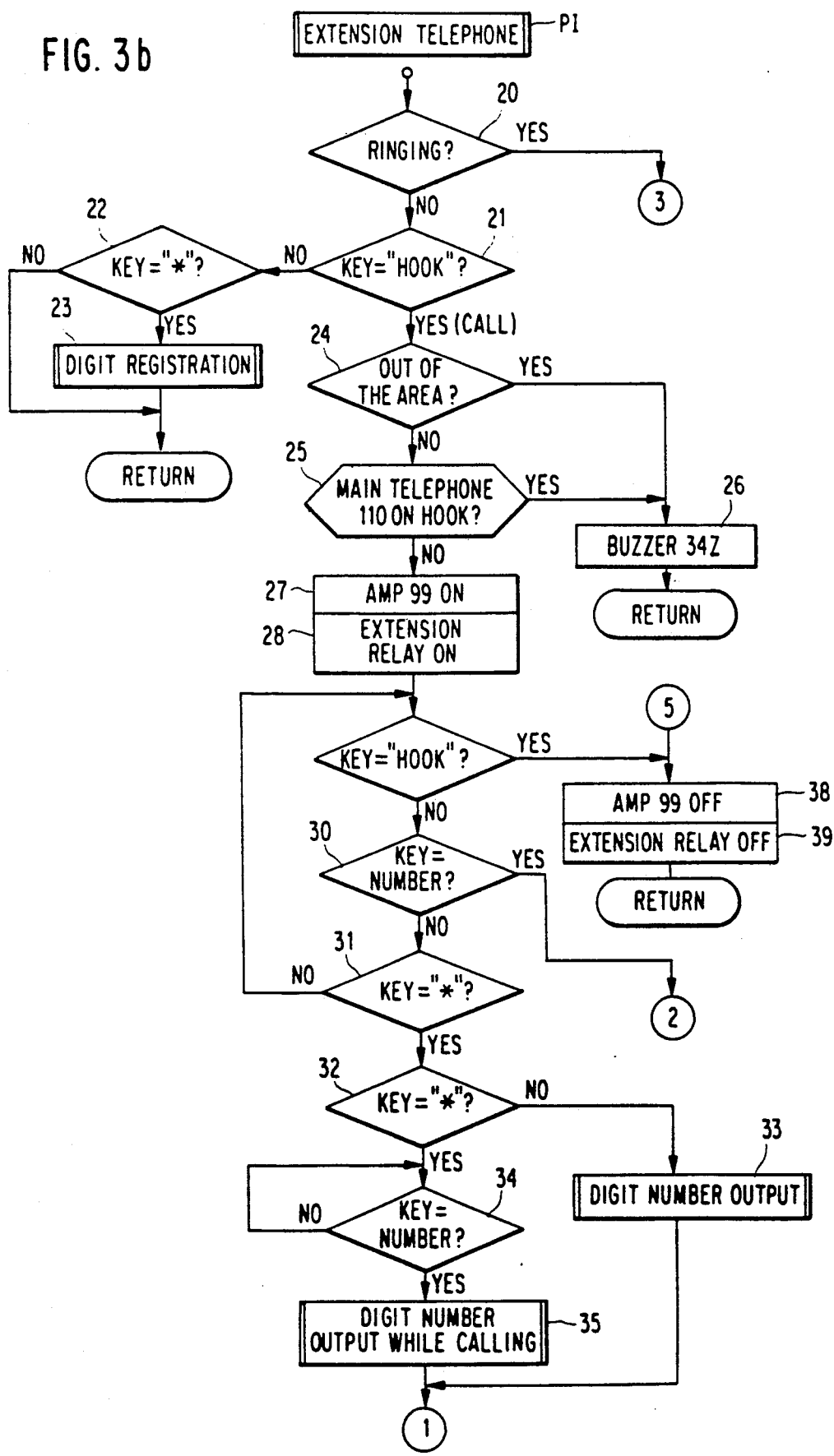
Figure 3C:
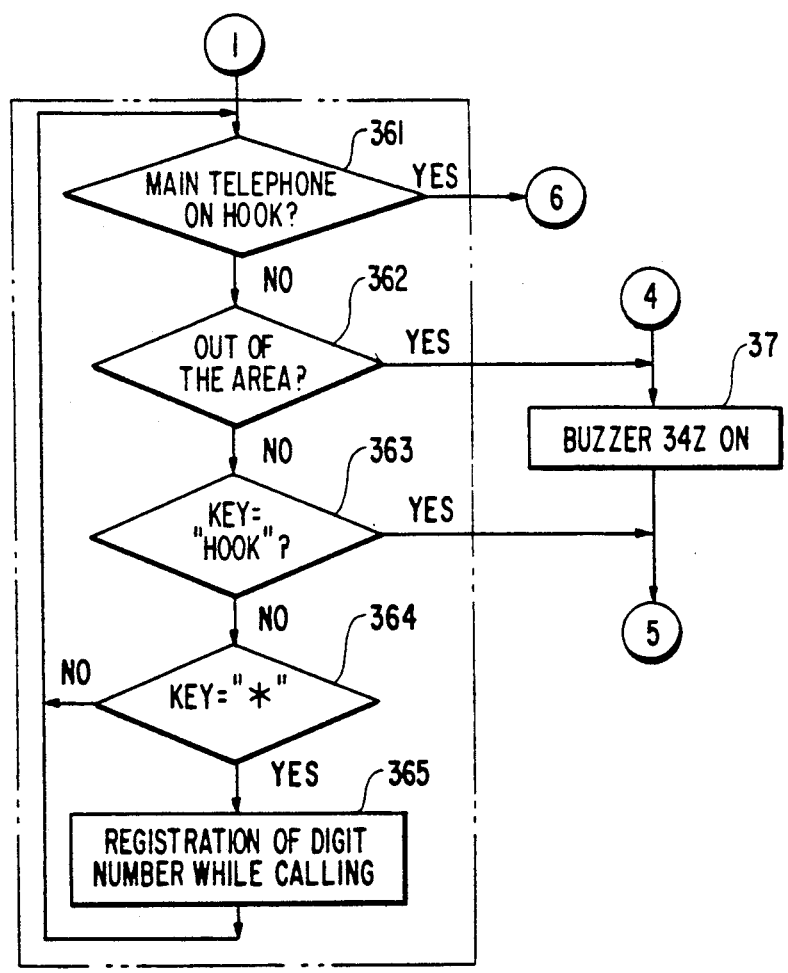
Figure 3D:
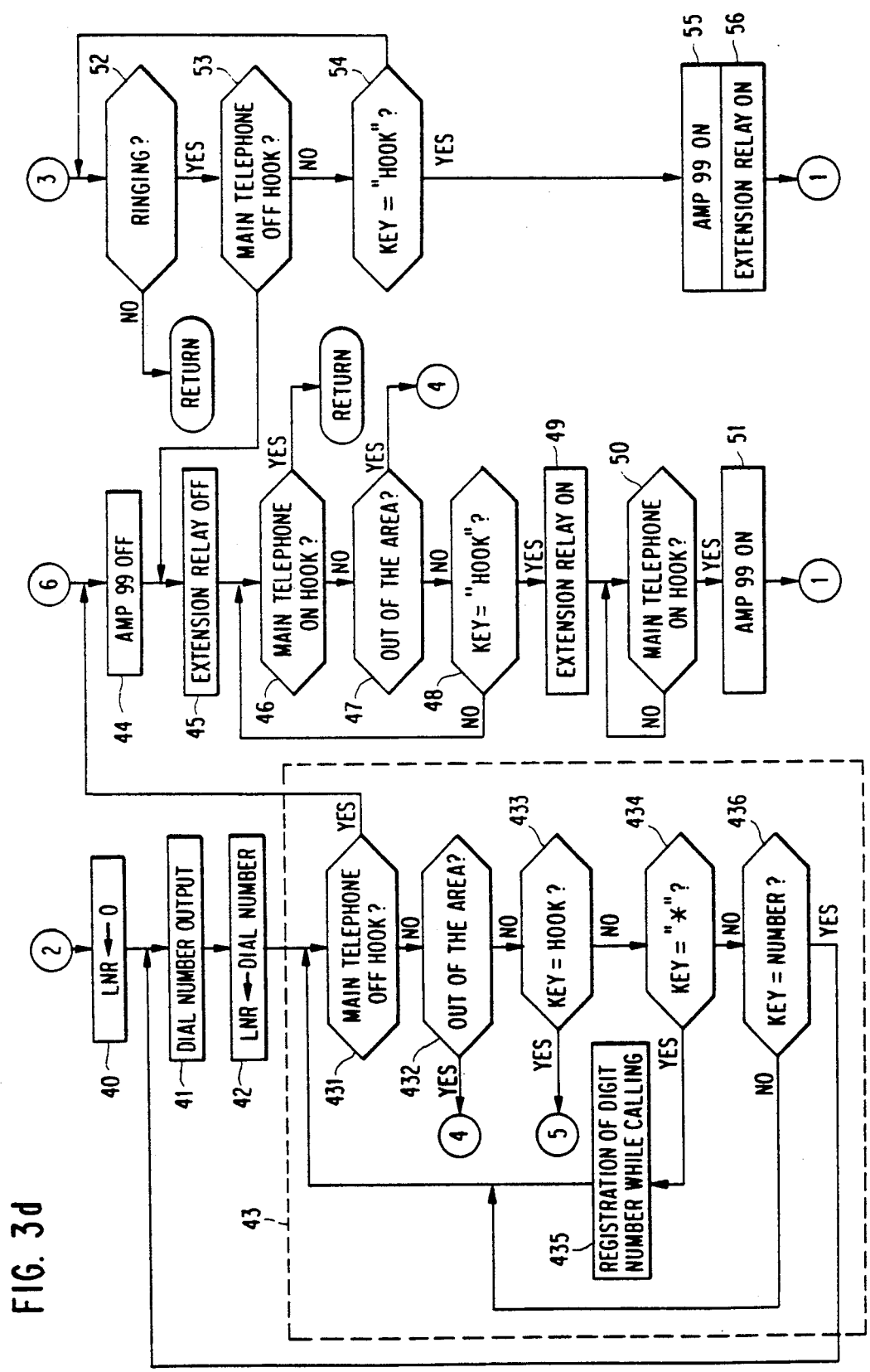

Referring to FIGS. 3a–3e, the operation of the CPU 32 will be explained. Referring to FIG. 3a, RAM data in the CPU 32 is maintained by supplying power from the waiting power supply circuit 34s. When the engine key 20 is closed and the power supply circuit 34 is turned "on", the control voltage is supplied to the CPU 32 to start the operation (step 1).

The CPU 32 initializes the output and input ports, internal counters, registers, flags and timers (step 2). In step 3, the CPU turns the transistor 35 "on". When the transistor 35 is turned "on", the relay coil 33a is energized to close the segment 33b so that the power supply line is established from battery 10 to the segment 33b and column power supply circuit 34. Thus, even if the key switch 20 is subsequently opened, the power supply to the column unit 30 is maintained.

The CPU 32 sets a timer $T_0$, which is a program timer, to count a time period $T_0$ (step 4) and waits for the time $T_0$ to expire (step 5). The time $T_0$ is set at a duration which is longer than the actual duration, after a signal which turns "on" the transistor 35 is latched at the output port, needed to establish a power line from the battery 10 to the segment 33b and the column power supply circuit 34.

Then the CPU 32 executes a sequence to control the power supply circuit "on", as shown in steps 6 to 12. The CPU 32 turns the transistor T2 "on" (step 6) and then waits for the time period of $T_1$ to expire (steps 7 and 8). The time $T_1$ is set at a duration which is longer than the actual duration, after a signal which turns the transistor T2 "on", needed for (i) the relay segment 55 to be changed over to the resistor R4, (ii) then second battery 101 to be recharged by the loop of the resistor R9, terminal 104, terminal 75, diode D4, diode D3, slip ring connector 63, segment 55 and resistor R4, (iii) the transistors T4 and T5 of the power supply circuit 102 to be turned "on", whereby a charging current is supplied to condenser C4 and C4 is recharged to a level sufficient to change the base voltage of the transistor T9 to a low level "L" (the second power "on" signal) so that the transistor T9 is turned "on" (extension telephone power supply "on") and (iv) ultimately the handset 80 is able to send and receive signals. In short, $T_1$ is greater than the actual time, after a signal which turns the transistor T2 "on" is latched to the output, for the handset to become ready for use.

When the time $T_1$ is over, the CPU 32 sends a code "power on" (the first signal) by sending a power on code to the encoder 38 (step 9). The encoder 38 sets this data into a shift register, which registers head and end data and the data frame. When the output is ordered, the encoder 38 sets the attenuator 41 on high attenuation and outputs data in the register in serial form, for a predetermined time, to the modulator 42 via a ring loop connection of the register. When the decoder 96 of the handset 80 receives this power on signal, the decoder 96 sends a set signal to a set terminal S of the latch 97P. Then the latch 97P is set and a high level signal "H" of the power supply circuit 102 is supplied to the transistor T6 in order to turn the transistor T6 "on" (at this time, the transistor T5 is also turned "on"). The low level signal "L" (the first power "on" signal) is applied to the base of the transistor T7.

The CPU 32 waits for the time $T_2$ to expire (steps 10 and 11). The time $T_2$ is set at a duration longer than an actual duration required, after the encoder 38 outputs the power "on" data, needed for the transistor T6 to be turned "on". When the time $T_2$ is expired, the CPU 32 turns the transistor T2 "off" (step 12). By turning the transistor T2 "off", the power supplied to the relay coil 54 is cut down and the relay segment 55 is turned back to the horn driver 50. Then, voltage from the battery 10 is supplied to the PC board 71 through the resistor R1, segment 55 and slip ring connector 63. Also, a constant voltage is supplied from the PC board 71 to the switch 98 through the terminals 74 and 103 and to the second battery 101 through the terminals 75 and 104. At the same time, by separating the segment 55 from the resistor R4, the current flowing through the resistor R9 from the second battery 101 to the terminal 104 is reduced. Then, the current flowing through the resistor R9 changes direction with respect to the second battery 101 so that the transistors T4 and T5 are turned "off" (removal of the second power "on" signal). However, because the transistor T6 is still turned "on", the transistor T9 of the handset power supply circuit 100 is turned "on" (extension telephone power "on").

The CPU 32 sends a code which means "On hook: Handset is returned to its place" (step 13) in the same way it sends the code "power on". When the decoder 96 receives the "On hook" signal, the decoder 96 sends a reset signal to the latch 97. The latch 97 is reset to output the "L" signal. When the latch 97s is reset, the switch 98 is turned to "off" and power from the PC board 71 is not supplied to the amplifier 99. The extension telephone power "on" control is ended when the key switch is turned "on". After these steps, the CPU 32 executes subroutines which are shown in FIGS. 3b-3e.

Referring to FIGS. 3b-3e, the CPU 32 checks the engine key 20 whenever control comes back to the main routine (FIG. 3a) from the extension telephone subroutine (PI) (step 16). When the key switch 20 is turned "on", the CPU 32 goes to the extension telephone subroutine (PI) again. When the switch 20 is opened, the CPU 32 sends the "on hook" code to the handset 80 in order to open the switch 96 (step 17). Then the CPU 32 sends a "power off" code (the second signal) to the handset 80 (step 18). When the decoder 96 receives the "power off" code, the decoder 96 sends a reset signal to the latch 97P. The output of the latch 97P is changed to the low "L" signal and by changing the base voltage of the transistor T7 to the high "H" signal (elimination of the first power "on" signal), the transistor T6 is turned "off", transistor T8 is turned "off" and transistor T9 is turned "off" (extension telephone power "off"). Then the CPU 32 turns off the relay 33a (step 19) and waits (step 20). By turning off the relay 33a, the segment 33b opens the line to cut down the power supply to the power supply circuit 34 because the key switch 20 has been opened already. Then the CPU 32 stops its operation but maintains the RAM data by power from the waiting power supply circuit 34S.

Referring to FIGS. 3b, 3c, 3d and 3e, the control of the extension telephone subroutine will be explained.

1) General Calling

The operator presses the "hook" key of the keys 82 and then dials a telephone number by using the keys 82. When he finishes calling, he presses the "hook" key again. The CPU 32 checks whether calling is out of the transmission area or not (steps 21, 24) and, if it is in the area, the CPU checks whether the main telephone is on hook (calling) (step 25). If the main telephone is not on hook (not calling), the CPU 32 turns the amplifier 99 "on" (step 27) and turns the extension relay "on" (step 28). The main telephone 110 is disconnected from the transmitter 60 and the column unit 30 is connected to the transmitter 60. If the calling is out of the area or the main telephone is on hook, the buzzer is energized for a certain time (step 26). Then the system goes back to the main routine.

When the CPU receives a dialed telephone number, the control goes to step 40 from step 30 in order to clear the last number register LNR (a part of the internal RAM of the CPU) (step 40) and saves the dialed number. The dialed telephone number signal is sent from the antenna 90 of the handset 80 and received by the antenna 44 of the column unit 30. Then the dialed number signal is sent to the CPU 32 through the amplifier 47 and the decoder 37. The CPU 32 changes the signal into a dial code (serial data) and sends it to the transmitter 60 through the interface 36 (step 41). The dialed telephone number is input to the last number register LNR (step 42). The CPU 32 waits for pressing of the "hook" key (step 433). If the "hook" key is pressed, the CPU 32 turns the amplifier 99 "off" (step 38) and turns the extension relay "off" (step 39). The column unit 30 is disconnected from the transmitter 60 and the main telephone 110 is connected. When the "hook" key is pressed before dialing a telephone number or a digit number, the control likewise turns the amplifier 99 "off" (step 38) and the extension relay "off" (step 39).

While the extension telephone is being used, if the main telephone 110 is hooked "off", the control turns the amplifier 99 "off" (steps 431, 44) and turns the extension relay 45 "off" (step 45). The control waits for the main telephone being hooked "on" (step 46) and, if the main telephone is hooked "on", the control goes back to the main routine. While the main telephone 110 is being used, if the extension telephone is hooked "off" by pressing the hook key (step 48), the control turns the extension relay 45 "on" (step 49), waits for the main telephone being hooked "on" (step 50) and turns the amplifier 99 "on" (step 51). The control waits for the handset being hooked "on" (steps 51, 361, 362, 363) and if the handset 80 is hooked "on", the control turns the amplifier 99 "off" (step 38) and the extension relay "off" (step 39). If the telephone is out of the area (steps 432, 47 or 362) during the time the control is waiting for the "on" hook (steps 29, 41 or 363), the buzzer 34z is energized for a short time.

2) Receiving a Call

When the main telephone 110 is called, the main telephone 110 rings. The operator hooks the main telephone or the handset "off" (first "hook" pressing). When he finishes the call, he hooks the main telephone or the handset "on" (second "hook" pressing).

When the CPU 32 receives a calling signal, the control waits for the main telephone 110 or the handset 80 to be hooked "off" (steps 20, 52, 53, 54). When the main telephone 110 is hooked "off", the control goes to the steps 45-48. If the handset 80 and the main telephone 110 are both hooked "off", the control goes to the extension control (steps 51-55, 56, 361-364).

3) Last Number Call

If operator calls the last telephone number again, he presses the hook key, the "*" key and "0" key in order. The CPU 32 turns the amplifier 99 and the extension relay "on" in response to the hook key (steps 20, 21, 24-28). Then the control goes to "output a digit number" (step 33) in response to the "*" key (steps 29-32, 33). At step 33, the control waits for the next input number and if it is "0", the control reads the data of the last number register LNR and changes it into a dialed number (serial data). Then the dialed number is sent to the transmitter 60 through the interface 36.

4) Digit Register

The RAM of the CPU 32 has an area for storing several digit numbers. This embodiment has an area for 19 telephone numbers. A telephone number is stored in a register; there being two sets comprising registers 0 to 9 and registers 10 to 18. The register 0 is used for the last number register LNR. The registers 1 to 9 are used for preset digit number registration and the registers 10 to 18 are used for registering a telephone number during a call.

In order to preset the digit number registration, the operator presses the "*" key first and then selects and presses a one digit number (a number from 1 to 9), inputs a telephone number and then presses the "*" key again. The CPU 32 control goes to digit number registration in FIG. 3b (steps 20, 21, 22, 23). At step 23, the control sets a register in accordance with the pressed one digit number and stores a telephone number in this register. The control goes back to the main routine when the "*" key is pressed.

5) Digit Calling

When the operator calls one of the registered telephone numbers, he presses the hook key first, then the "*" key, and then presses the particular digit number corresponding to the telephone number which he wants to call. The CPU 32 turns the amplifier 99 and the extension relay "on" (steps 20, 21, 24, 25, 27, 28) in response to the hook key. The control goes to "output the digit number" step 33 in response to the "*" key (steps 29-32, 33). At step 33, the CPU 32 reads the telephone number data out of the register which corresponds to the digit number and outputs the data to encoder 38.

6) Digit Register During Calling

Figure 3E:
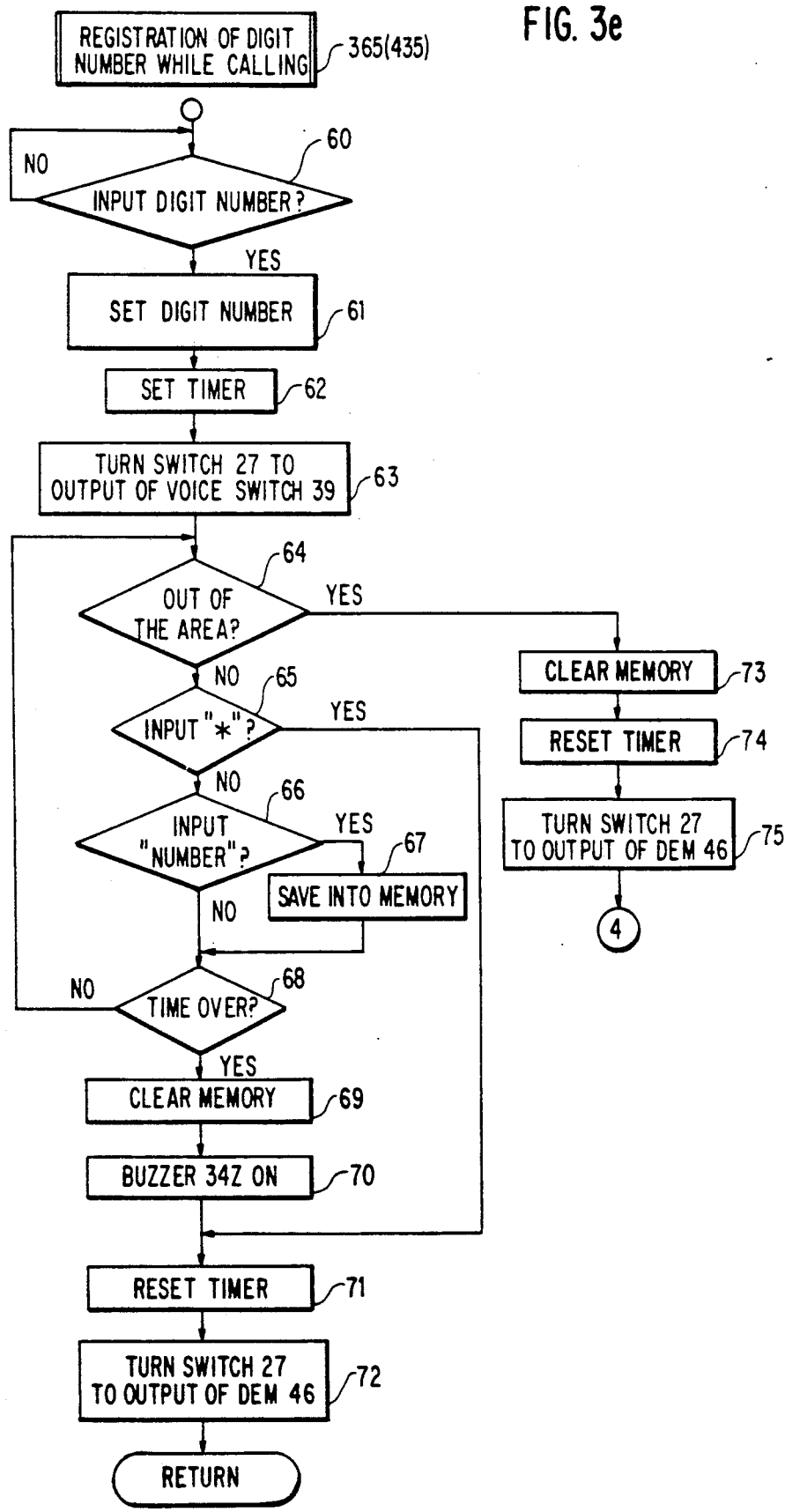

When an operator wishes to store a telephone number from another party, the operator asks the other party to input a telephone number by using the other's telephone. The operator immediately presses the "*" key and then presses one digit number "J" (J=1-9). He waits for the dialing sound input by the other party. The CPU goes to "digit register during calling" (steps 365 or 345) when the "*" key is pressed during calling (steps 364, 365, 434, 435). FIG. 3e shows the "digit register during calling" routine. The control waits for a "J" key input (step 60, i.e. a one-digit number) and when a digit "J" is pressed, the CPU 32 sets a register J+9 (step 610), starts a timer (step 62), turns the switch 27 to the voice switch 39 (step 63) and waits for the key signals from the party's telephone (steps 64-66). When the key signals are received, the signals are decoded by the decoder 37 and sent to the CPU 32. The CPU 32 stores the number signal in the register J+9 (steps 66, 67) and, when the CPU 32 detects the "*" key input, the CPU 32 resets the timer (steps 65,71) and turns the switch 27 back to the demodulator 46 (step 72) then goes back to normal control (steps 361 or 431). By the above procedures, a telephone number is registered automatically.

If the telephone goes out of the area during the period when it is waiting for the number signal or "*" key, the timer expires, the control clears the register J+9 (steps 73, 69) resets the timer (steps 75, 71) and turns the switch 27 to the demodulator 46 (steps 75, 72). The buzzer also is energized to signal this event.

7) Digit Calling Register During Calling

The operator presses the hook key and "*" key and presses the "*" key again, then presses a digit. The CPU 32 turns the amplifier 99 and the extension relay "on" (steps 20, 21, 24-28) and waits for the "*" key input (step 31). If the CPU 32 receives the "*" key input, the CPU 32 waits for another "*" key input and a J (digit) key input. When the CPU receives the J key input, the CPU executes "output digit number" (step 35). At step 35, the CPU 32 reads and outputs the number registered in the register J+9.

The invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

What is claimed:

1. A telephone apparatus, comprising:
   a key pad including digit keys, a hook key and control keys, for generating respective key signals;
   means for taking the telephone off-hook in response to a first depression of said hook key;
   a memory including a plurality of individually operator designatable registers for registering telephone numbers;
   means for recognizing depression of a predetermined control key of said telephone, at a time after said telephone has been taken off-hook, as an indicator that a telephone number is to be registered in an operator designated one of said registers from a remote source comprising a remote telephone;
   a decoder for decoding a telephone number input from said remote telephone;
   switch means operated in response to said recognizing means for switching a signal received from said remote telephone to said decoder; and
   means for storing the output of said decoder, comprising a decoded telephone number, in an operator designated one of said registers.

2. An apparatus as claimed in claim 1, wherein said recognizing means further recognizes depression of a digit key, after said depression of said predetermined control key, as a designator of the register to be used for storing said decoded telephone number.

3. An apparatus as claimed in claim 2, wherein said recognizing means further recognizes depression of a control key, after depression of said register-designating digit key, as an indicates that said telephone number input from said remote telephone has been fully received.

4. An apparatus as claimed in claim 1, wherein said telephone apparatus further includes speed dialing means, and wherein said recognizing means recognizes a combination of depression of at least one control key followed by a digit key as a command to speed dial a telephone number received and decoded from a remote telephone, and wherein the digit key of said combination is a designator of the register containing the desired telephone number.

5. An apparatus as claimed in claim 1, wherein said memory further comprises a location for a last-dialed telephone number.

6. An apparatus as claimed in claim 1, further comprising timer means for limiting the period of time during which the telephone number input from said remote telephone can be received.

* * * * *